US010139554B2

(12) United States Patent
Li

(10) Patent No.: US 10,139,554 B2
(45) Date of Patent: Nov. 27, 2018

(54) BACKLIGHT MODULE AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

(*) Notice: Subject to any disclaimer, the term of this patent is extended or adjusted under 35 U.S.C. 154(b) by 0 days.

(21) Appl. No.: 15/125,709

(22) PCT Filed: Nov. 11, 2015

(86) PCT No.: PCT/CN2015/094322
§ 371 (c)(1),
(2) Date: Sep. 13, 2016

(87) PCT Pub. No.: WO2016/188047
PCT Pub. Date: Jan. 12, 2016

(65) Prior Publication Data
US 2017/0123143 A1 May 4, 2017

(30) Foreign Application Priority Data
May 26, 2015 (CN) .......................... 2015 1 0275258

(51) Int. Cl.
*G02B 6/00* (2006.01)
*F21V 8/00* (2006.01)
(52) U.S. Cl.
CPC ......... *G02B 6/0088* (2013.01); *G02B 6/0081* (2013.01)

(58) Field of Classification Search
CPC ........................... G02B 6/0088; G02B 6/0081
(Continued)

(56) References Cited

U.S. PATENT DOCUMENTS

2013/0083557 A1* 4/2013 Hsiao ................ G02F 1/133308
362/608

FOREIGN PATENT DOCUMENTS

CN    202166805 U    3/2012
CN    102418882 A    4/2012
(Continued)

OTHER PUBLICATIONS

First Chinese Office Action dated Oct. 8, 2016; Appln. No. 201510275258.7.
(Continued)

*Primary Examiner* — Daniel Hess
(74) *Attorney, Agent, or Firm* — Ladas & Parry LLP

(57) ABSTRACT

A backlight module and a display device are provided. The backlight module includes a plastic frame and a light guiding plate provided within the plastic frame. For each non-incident side of two parallel non-incident sides of the plastic frame, a respective space-keeping structure is provided at an end of a side edge on the non-incident side, with the end of the side edge on the non-incident side being close to a side edge of an incident side; and a side of the space-keeping structure that is away from an end surface of the light guiding plate is sealed with a cover structure. The present arrangement can effectively reduce bright lines at side edges occurring in the backlight module, and thus improve image-display quality of the backlight module.

16 Claims, 5 Drawing Sheets

(58) Field of Classification Search
   USPC .......................................................... 362/633
   See application file for complete search history.

(56) References Cited

FOREIGN PATENT DOCUMENTS

| CN | 102494280 A | 6/2012 |
|----|-------------|--------|
| CN | 102889523 A | 1/2013 |
| CN | 203549696 U | 4/2014 |
| CN | 103941474 A | 7/2014 |
| CN | 104061488 A | 9/2014 |
| CN | 204028508 U | 12/2014 |
| CN | 104806932 A | 7/2015 |

OTHER PUBLICATIONS

International Search Report and Written Opinion dated Mar. 2, 2016; PCT/CN2015/094322.
Second Chinese Office Action dated Mar. 22, 2017; Appln. No. 201510275258.7.
The Third Chinese Office Action dated Oct. 9, 2017; Appln. No. 201510275258.7.

* cited by examiner

BACKLIGHT MODULE AND DISPLAY DEVICE

TECHNICAL FIELD

Embodiments of the present disclosure relate to a backlight module and a display device comprising the same.

BACKGROUND

Presently, a backlight module of a liquid crystal display device generally employs LEDs (light-emitting diode) as its light sources. Backlight modules can be classified into a direct-downward type and a side-entrance type depending on distribution positions of the light sources. An LED light strip in a backlight module of a side-entrance type is located at a side edge of a light guiding plate, and such a backlight module is mainly applied in notebooks, palm computers, cell phones and similar small-sized display devices. With the continuously improvement of the LED-related technologies, backlight modules of the side-entrance type also begin to be applied in larger-sized display devices to provide even better visual experience for the users.

With the continuously improvement of the technologies, characteristics such as being ultrathin, high-lightening, and narrow frame have become the main stream in the consumer market for the display products; in order to meet the development trend of the narrow frame, a width of a light-shielding tape is also getting narrower. However, due to the narrow width of the light-shielding tape, a side region of a backlight module frame has relatively concentrated light (as shown by a circled region in FIG. 1), where bright lines are easily to be generated, which may cause poor image quality and have bad influence on display quality of the display device.

SUMMARY

Embodiments of the present disclosure aim to provide a backlight module and a display device comprising the same, so as to depress bright lines at side edges of the backlight module and improve image-display quality of the backlight module.

Embodiments of the present disclosure provide a backlight module. The backlight module includes a plastic frame and a light guiding plate provided within the plastic frame. For each non-incident side of two parallel non-incident sides of the plastic frame, a respective space-keeping structure is provided at an end of a side edge on the non-incident side, with the end of the side edge on the non-incident side being close to a side edge of an incident side of the plastic frame. A side of the space-keeping structure that is away from an end surface of the light guiding plate is sealed with a cover structure.

In the technical solution according to the above embodiment of the present disclosure, the space-keeping structure provides a large spacing between an end surface of the light guiding plate and the cover structure. In this way, it is possible to increase an optical path of light exiting from the end surface of the light guiding plate, where a portion of the light existing from the end surface of the light guiding plate is absorbed by the cover structure, and another portion is reflected by the cover structure and then reenters into the light guiding plate. The light reentering into the light guiding plate exits from an upper surface of the light guiding plate at a location far from a side edge of the plastic frame, and therefore, the present solution can effectively depress bright lines at the side edge of the backlight module and improve image-display quality of the backlight module.

In some embodiments, the space-keeping structure is a first step groove opening upward or downward and the cover structure is an adhesive tape fixed to an outer wall of the plastic frame. Such a configuration has a simple and feasible design with low cost. The "opening upward" herein refers to that an opening of the groove faces towards the light exiting surface of the light guiding plate, or towards a front side of the display device. The "opening downward" herein refers to that the opening of the groove faces towards a direction of the backboard, or towards a back side of the display device.

In some embodiments, a groove length L1 of the first step groove satisfies: $\frac{1}{5}L \leq L1 \leq \frac{1}{3}L$, wherein L is a length of the side edge on the non-incident side where the first step groove locates; and a groove depth h of the first step groove satisfies: $\frac{1}{2}t \leq h \leq t$, wherein t is a thickness of a flat portion of the light guiding plate.

In some embodiments, the backlight module further comprises a light-shielding tape provided above the plastic frame and the light guiding plate;

a vertical wall of the first step groove that is close to the side edge of the incident side has a distance L2 from an outer wall of the side edge of the incident side, and the distance L2 satisfies: $\frac{3}{4}L3 \leq L2 \leq L3$, where L3 is a distance from the outer wall of the side edge of the incident side to an inner boundary of the light-shielding tape.

Due to the fact that bright lines at side edges usually concentrate at the region close to the incident side, the structural dimension design of the above embodiment may be used when the structural strength of the plastic frame and the optical effect of the backlight module are sufficiently taken into consideration.

In some embodiments an outer wall of the plastic frame has a second step groove for accommodating the adhesive tape. The second step groove may provide a position for bonding the adhesive tape, and since the adhesive tape sinks into the second step groove, it is possible to enable a relatively smooth external appearance of the plastic frame.

In some embodiments, a groove depth of the second step groove is not less than a thickness of the adhesive tape, and an adhesive bonding length w between the adhesive tape and the outer wall of the plastic frame satisfies $0.45 \text{ mm} \leq w \leq 1 \text{ mm}$. While a smooth appearance of the plastic frame is ensured, the adhesive bonding between the adhesive tape and the outer wall of the plastic frame is also relatively strong.

In some embodiments, the adhesive tape comprises a black adhesive tape, a white adhesive tape or a transparent adhesive tape; and the adhesive tape is a single-sided adhesive tape, or the adhesive tape comprises a base layer and double-sided adhesive layers adhered to regions of the base layer that directly face the outer wall of the plastic frame. The colors of the adhesive tape are not limited to the above-mentioned colors. When the side edge has a high brightness, a black adhesive tape can be selected; but when the side edge has a low brightness, a white or transparent adhesive tape may be selected.

In some embodiments, the two parallel non-incident sides of the plastic frame have symmetric space-keeping structures at their respective side edges. Such a design facilitates the production and manufacture, and can have a better frame consistency for the backlight module.

In some embodiments, the plastic frame and the cover structure are configured in an integrated structure. That is, the plastic frame and the cover structure are formed by an integral injection molding, and this embodiment also could effectively reduce the bright lines at side edges of the backlight module and improve the image-display quality of the backlight module.

Embodiments of the disclosure also provide a display device comprising any backlight module described above. Due to the improvement of the bright lines at the side edges of the backlight module, the display device therefore has a better display effect.

BRIEF DESCRIPTION OF THE DRAWINGS

In order to illustrate the technical solutions in the embodiments of the present disclosure more clearly, the drawings need to be used in the description of the embodiments will be briefly described in the following; it is obvious that the drawings described below are only related to some embodiments of the present disclosure and not used to restrict the disclosure.

FIG. 2b is an enlarged schematic view of a portion A of FIG. 2a.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

Figure 1:
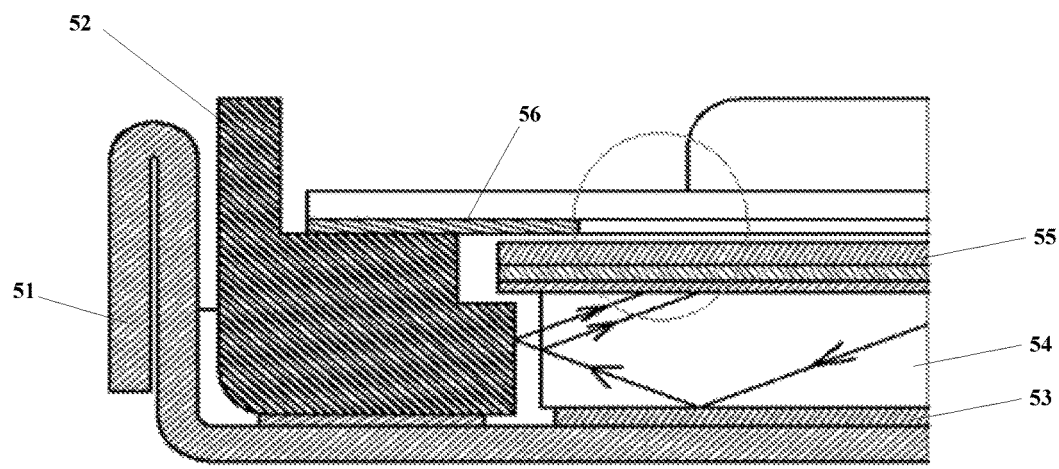
FIG. 1 is a structural schematic view showing a partial cross section of a backlight module.

FIG. 1 shows a backlight module of a side-entrance type. A configuration of the side-entrance-type backlight module mainly comprises a backboard 51, a plastic frame 52, a reflector plate 53, a light guiding plate 54, a LED light source (not shown in the figures because of viewing angle), a film material assembly 55, a light-shielding tape 56 and so on, where the light-shielding tape 56 may be used to fix the film material assembly 55 and shield a side region of the frame.

To reduce bright lines at side edges of the backlight module and improve the image-display quality of the backlight module, embodiment's of the present disclosure provide a backlight module and a display device. In order to make the objective, the technical solution and advantages of the present disclosure to be more clear, a further detailed description of the present disclosure will be made in conjunction with the following embodiments.

As shown in FIGS. 2a, 2b, 4 and 5, embodiments of the present disclosure provide a backlight module, comprising a plastic frame 2 and a light guiding plate 4 provided within the plastic frame 2. Side edges on two parallel non-incident sides of the plastic frame each have a space-keeping structure (such as, a first step groove 21) at an end that is close to a side edge on an incident side respectively, and a side of the space-keeping structure that is away from an end surface of the light guiding plate 4 is sealed with a cover structure (for example, an adhesive tape 22).

Figure 6:
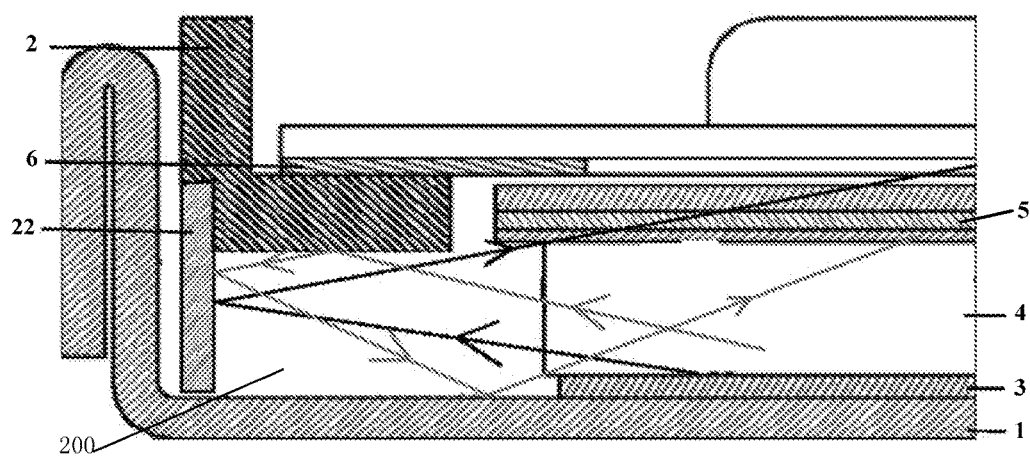
FIG. 6 is a partial cross-sectional schematic view of a structure of a backlight module in embodiments of the present disclosure.

As shown in FIG. 6, besides the light guiding plate 4 and the plastic frame 2, a primary structure of the backlight module further comprises a backboard 1, a reflector plate 3, a light source (which is not shown in FIG. 6 due to the viewing angle of FIG. 6, but shown as element "50" in FIG. 9 near a light incident side of the light guiding plate 4), a film material assembly 5, a light-shielding tape 6 and so on. The light source for the side-entrance-type backlight module is provided at an end surface of at least one side of the light guiding plate 4, and the light from the light source is incident on the end surface of the light guiding plate 4. It should be appreciated that an "incident side" refers to a side where the light source is provided correspondingly, and a non-incident side refers to a side where no light source is provided.

Figure 5:
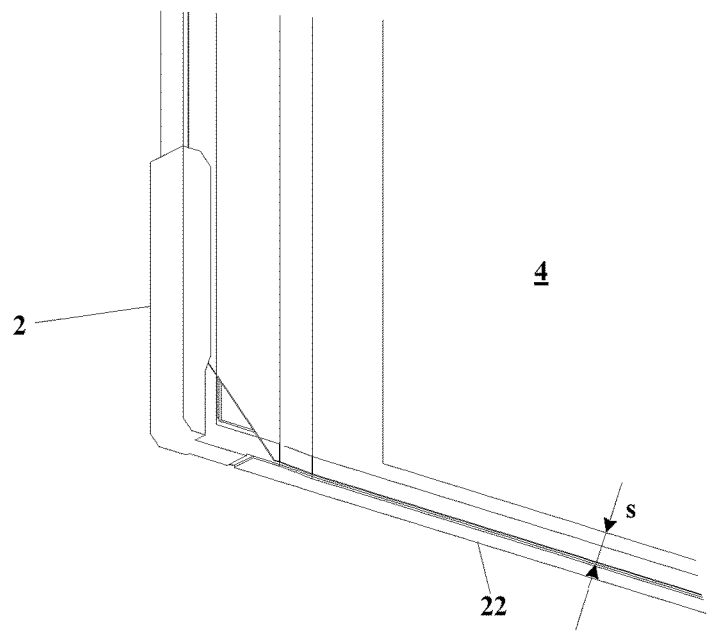
FIG. 5 is a bottom structural schematic view of a backlight module in embodiments of the present disclosure.

It is observed from FIGS. 5 and 6 that, the space-keeping structure 200 provides a large spacing "s" between the end surface of the light guiding plate 4 and the cover structure 22. In this way, it is possible to increase an optical path of the light exiting from the end surface of the light guiding plate 4. A portion of the light exiting from the end surface of the light guiding plate 4 is absorbed by the cover structure, and another portion is reflected by the cover structure and then reenters into the light guiding plate 4. The light reentering into the light guiding plate 4 exits from an upper surface of the light guiding plate at a location far from the side edge of the plastic frame 2, and therefore, the present solution can effectively depress the bright lines at side edges of the backlight module and improve the image-display quality of the backlight module. In the embodiment as shown in FIG. 6, a groove depth h of the first step groove is t, which is a thickness of a flat portion of the light guiding plate 4; and in this embodiment, the space-keeping structure 200 is the first step groove 21 opening downward, and the first step groove faces directly towards the backboard 1.

The space-keeping structure and the cover structure are not restricted in their specific structure forms. In one embodiment of the present disclosure, the plastic frame and the cover structure are configured in an integrated structure. That is to say, the plastic frame and the cover structure are formed by an integral injection molding, and this embodiment also could effectively reduce the bright lines at side edges of the backlight module and improve the image-display quality of the backlight module.

Figure 2A:
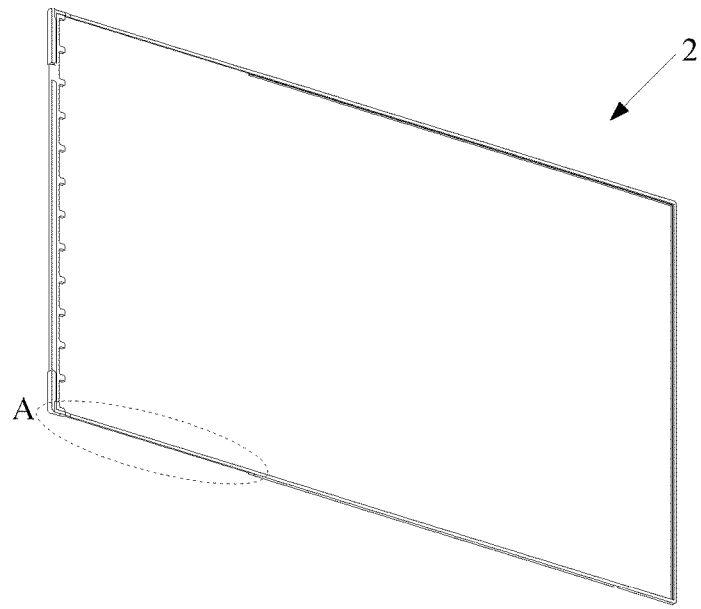
FIG. 2a is a structural schematic view showing a plastic frame of a backlight module in embodiments of the present disclosure.
Figure 2B:
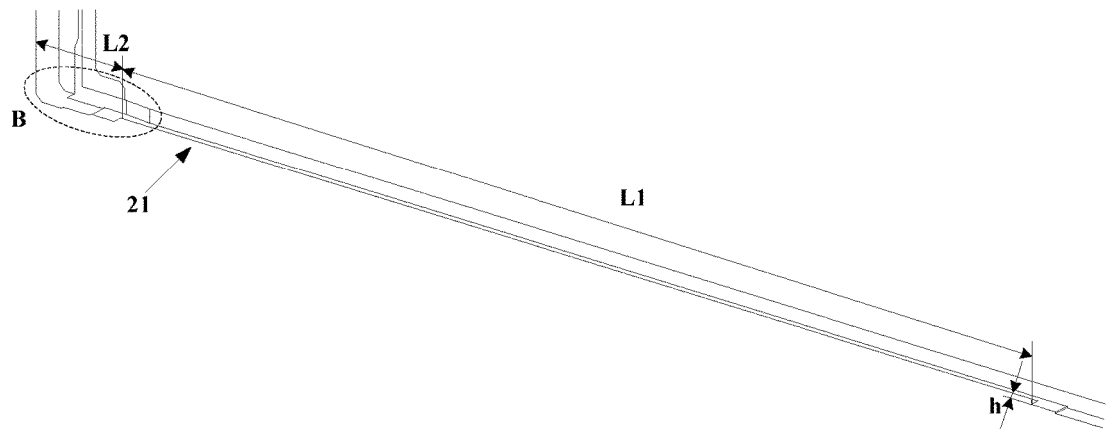
Figure 4:
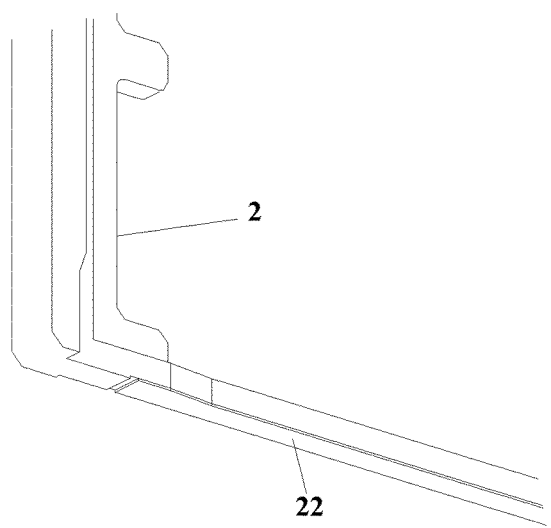
FIG. 4 is a schematic view showing an adhesive bonding between an adhesive tape and a plastic frame in embodiments of the present disclosure.

As shown in FIGS. 2b and 4, in this embodiment, the space-keeping structure is the first step groove 21 opening downward, and the cover structure is an adhesive tape 22 fixed on an outer wall of the plastic frame 2. Such a structural design is simple and feasible with a low cost, and provides sufficient structural strength for the plastic frame 2. It is worth to mention that, in other embodiments of the present disclosure, the first step groove may also be designed to open upward, which can also achieve the effect of reducing the bright lines at side edges of the backlight module.

A groove length and depth of the first step groove 21 are not restricted in the disclosure. In some embodiments, the groove length L1 of the first step groove 21 satisfies: $\frac{1}{5}L \leq L \leq \frac{1}{3}L$, where L is a length of a side edge on a non-incident side where the first step groove 21 locates; the groove depth h of the first step groove 21 satisfies: $\frac{1}{2}t \leq h \leq t$, where t is a thickness of a flat portion of the light guiding plate 4. For a flat light guiding plate, t is the thickness of the light guiding plate; for a light guiding plate comprising wedge portions and flat portions, t is the thickness of the flat portions. In some embodiments of the present disclosure, $L1=\frac{1}{4}L$.

Figure 3:
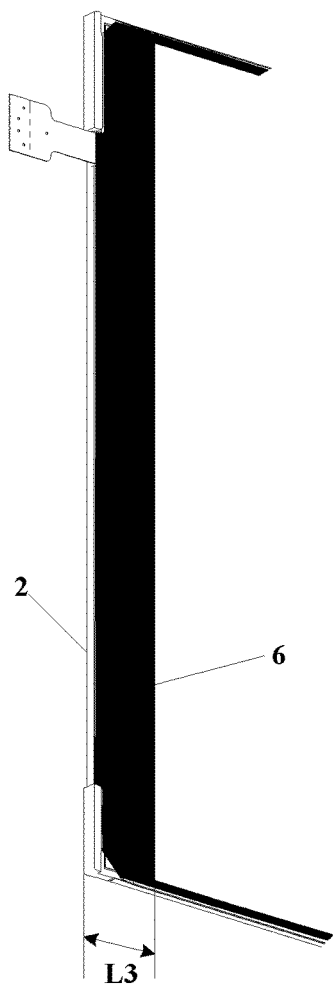
FIG. 3 is a partial structural schematic view of a backlight module in embodiments of the present disclosure.

As show in FIGS. 2b and 3, the backlight module further comprises a light-shielding tape 6 provided above the plastic frame 2 and the light guiding plate; a vertical wall of the first step groove 21 that is close to a side edge of the incident side has a distance L2 to an outer wall of the side edge on the incident side, and the distance L2 satisfies: $\frac{3}{4}L3 \leq L2 \leq L3$, where L3 is a distance from the outer wall of the side edge on the incident side of the plastic frame 2 to an inner boundary of the light-shielding tape 6.

In some embodiments, due to the fact that the bright lines at side edges usually concentrate at a region close to the incident side, the structural dimension design of the above embodiment can be used when the structural strength of the plastic frame and the optical effect of the backlight module are sufficiently taken into consideration.

Figure 2C:
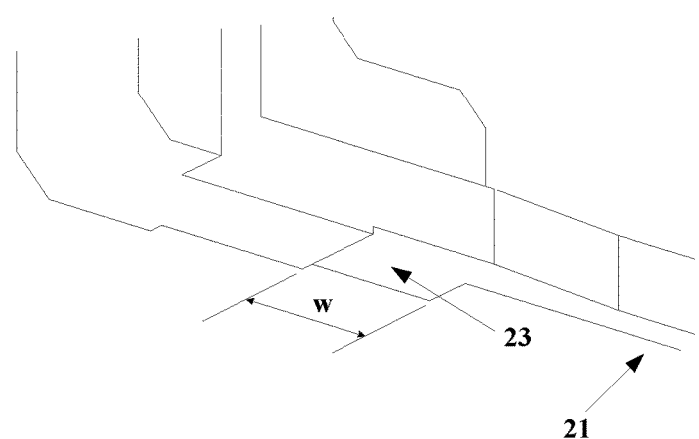
FIG. 2c is an enlarged schematic view of a portion B of FIG. 2b.

Referring to FIG. 2c again, the outer wall of the plastic frame 2 has a second step groove 23 for accommodating the adhesive tape. The second step groove 23 may provide a position for bonding the adhesive tape, and since the adhesive tape sinks into the second step groove 23, it is possible to enable the plastic frame to have a relatively smooth external appearance. In some embodiments, regarding the dimension design, a groove depth of the second step groove 23 is not less than a thickness of the adhesive tape, and an adhesive bonding length w between the adhesive tape and the outer wall of the plastic frame satisfies $0.45 \text{ mm} \leq w \leq 1 \text{ mm}$. While a smooth external appearance of the plastic frame is ensured in this way, the adhesive bonding between the adhesive tape and the outer wall of the plastic frame is also relatively strong.

Figure 7:
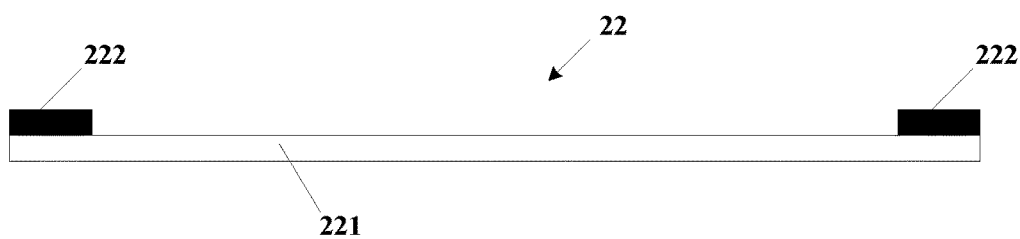
FIG. 7 is a structural schematic view of an adhesive tape.

The color of the adhesive tape 22 is not restricted; for example, it may be a black adhesive tape, a white adhesive tape or a transparent adhesive tape, and so on. The selection of the adhesive tape 22 may be performed according to the actual brightness at the side edge of the backlight module. For example, when the side edge of the backlight module has a higher brightness, the adhesive tape can be chosen as a strong light-absorbing black adhesive tape; when the side edge of the backlight module has a lower brightness, the adhesive tape can be chosen as a strong reflective white adhesive tape; and furthermore, the adhesive tape can also be chosen as an adhesive tape of other colors according to actual conditions. The adhesive tape may also be a single-sided adhesive tape; furthermore, as shown in FIG. 7, the adhesive tape 22 may also comprise a base layer 221 and double-sided adhesive layers 222 adhered to regions of the base layer 221 that directly face the outer wall of the plastic frame. The base layer 221 may employ transparent polyethylene terephthalate PET material or polyethylene terephthalate PET material with other colors.

Figure 8:
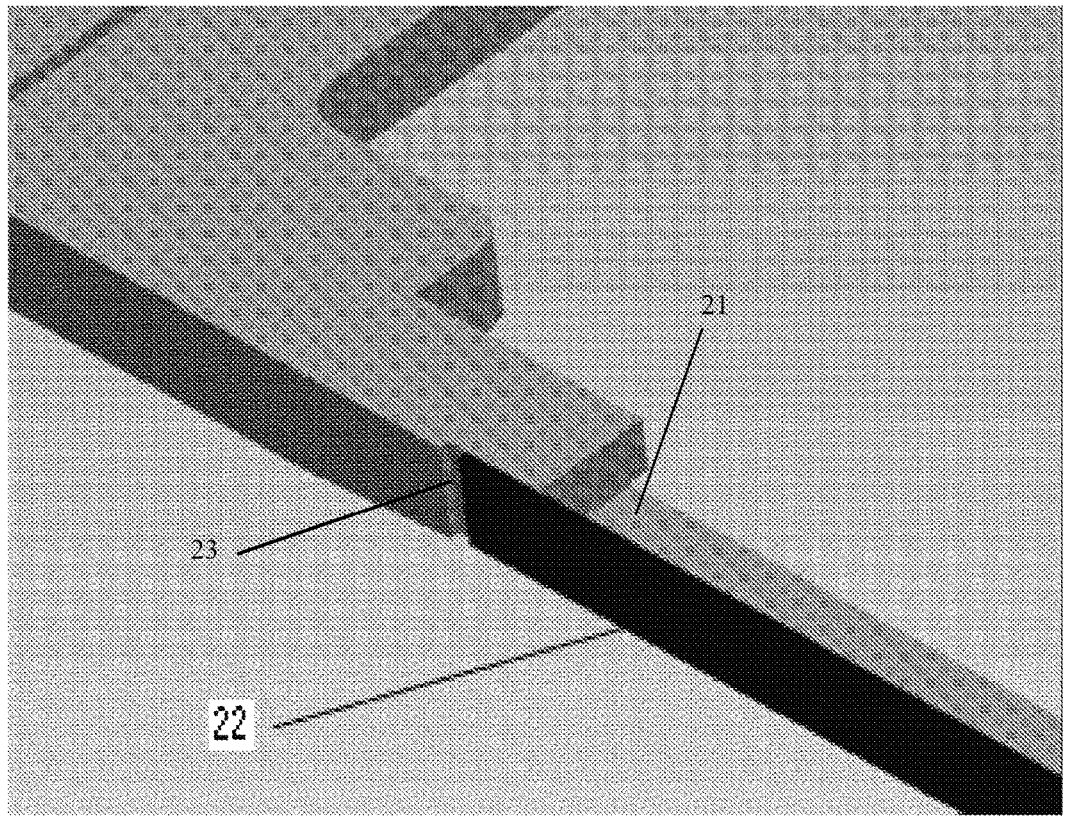
FIGS. 8 and 9 illustrates that a first step groove opens upward (or in other words, towards a front side of a display device) in one embodiment of the disclosure.
Figure 9:
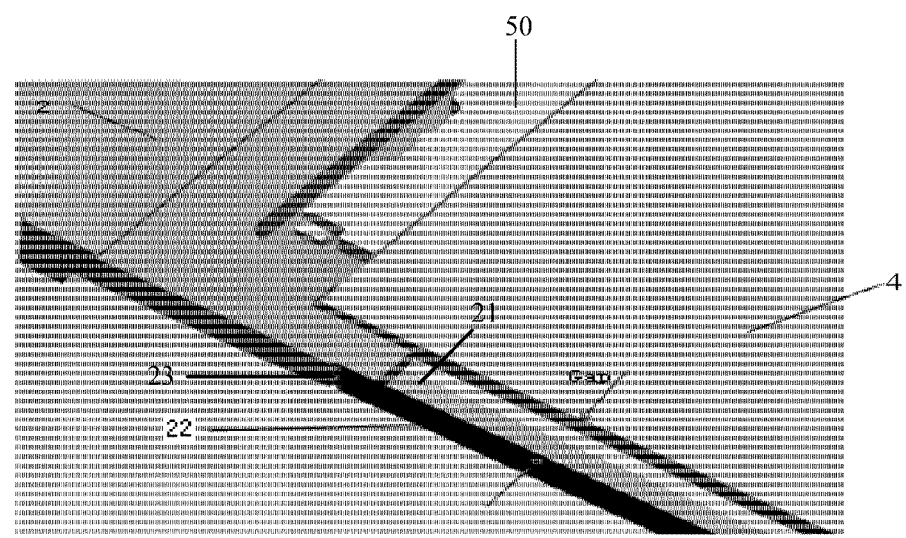

FIGS. 8 and 9 illustrates one embodiment of the present disclosure in which the first step groove opens upward (or in other words, towards the front side of the display device). As shown in FIGS. 8 and 9, a space-keeping structure is provided at an end of a side edge on the non-incident side of the plastic frame 2, with the end of the side edge on the non-incident side of the plastic frame 2 being close to a side edge of the incident side. The space-keeping structure is a first step groove that opens upward, and a side of the space-keeping structure that is away from an end surface of the light guiding plate is sealed with a cover structure. The cover structure is the adhesive tape 22 fixed to the outer wall of the plastic frame. The adhesive tape 22 is accommodated into the second step groove of the outer wall of the plastic frame. As shown in FIG. 9, a gap is created at the first step groove between the light guiding plate 4 and the adhesive tape 22, which forms the space-keeping structure.

Furthermore, in some embodiments, for the convenience of production and manufacture and also for enabling a better frame consistency of the backlight module, space-keeping structures at side edges of the two parallel non-incident sides of the plastic frame 2 are symmetrical.

The embodiments of the present disclosure also provide a display device comprising any one of the aforesaid backlight modules. Due to the improvement of the bright lines at side edges of the backlight module, the display device therefore has a better display effect. The type of the display device is not limited, for example, it could be a cellphone, a notebook, a tablet, a liquid crystal TV and so on.

What are described above is related to the illustrative embodiments of the disclosure only and not limitative to the scope of the disclosure. The scopes of the disclosure are defined by the accompanying claims.

The present application claims the priority of the Chinese Patent Application No. 201510275258.7 filed on May 26, 2015, which is incorporated herein by reference in its entirety as part of the disclosure of the present application.

What is claimed is:

1. A backlight module comprising a plastic frame and a light guiding plate provided within the plastic frame, wherein:

the plastic frame has two parallel non-incident sides, with each non-incident side of the plastic frame including a structure with a first step groove at an end of a side edge, and with the end of the side edge on the non-incident side being close to a side edge of an incident side of the plastic frame;

a side of the structure with the first step groove that is away from an end surface of the light guiding plate is sealed with a cover structure, and an outer wall of the plastic frame has a second step groove for accommodating the cover structure;

the light guiding plate and the cover structure are spaced apart from each other at least by a width of the first step groove to increase an optical path of light exiting from the end surface of the light guiding plate;

the backlight module further comprises a light-shielding tape provided above the plastic frame and the light guiding plate; and a vertical wall of the first step groove that is close to the side edge of the incident side has a distance L2 from an outer wall of the side edge of the incident side, and the distance L2 satisfies: $\frac{3}{4}L3 \leq L2 \leq L3$, where L3 is a distance from the outer wall of the side edge of the Incident side to an inner boundary of the light-shielding tape.

2. The backlight module according to claim 1, wherein the first step groove is opened upward or downward and the cover structure is the adhesive tape fixed to an outer wall of the plastic frame.

3. The backlight module according to claim 2, wherein:
a groove length L1 of the first step groove satisfies: $\frac{1}{5}L \leq L1 \leq \frac{1}{3}L$, wherein L is a length of the side edge on the non-incident side where the first step groove locates; and
a groove depth h of the first step groove satisfies: $\frac{1}{2}t \leq h \leq t$, wherein t is a thickness of a flat portion of the light guiding plate.

4. The backlight module according to claim 3, wherein the two parallel non-incident sides of the plastic frame have symmetric structures with respective first step grooves at their respective side edges.

5. The backlight module according to claim 3, wherein the plastic frame and the cover structure are configured in an integrated structure.

6. The backlight module according to claim 2, wherein the second step groove is used for accommodating the adhesive tape.

7. The backlight module according to claim 6, wherein a groove depth of the second step groove is not less than a thickness of the adhesive tape, and an adhesive bonding length w between the adhesive tape and the outer wall of the plastic frame satisfies 0.45 mm≤w≤1 mm.

8. The backlight module according to claim 6, wherein:
the adhesive tape comprises a black adhesive tape, a white adhesive tape or a transparent adhesive tape; and
the adhesive tape is a single-sided adhesive tape, or the adhesive tape comprises a base layer and double-sided adhesive layers adhered to regions of the base layer that directly face the outer wall of the plastic frame.

9. The backlight module according to claim 2, wherein:
the adhesive tape comprises a black adhesive tape, a white adhesive tape or a transparent adhesive tape; and
the adhesive tape is a single-sided adhesive tape, or the adhesive tape comprises a base layer and double-sided adhesive layers adhered to regions of the base layer that directly face the outer wall of the plastic frame.

10. The backlight module according to claim 3, wherein the second step groove is used for accommodating the adhesive tape.

11. The backlight module according to claim 3, wherein:
the adhesive tape comprises a black adhesive tape, a white adhesive tape or a transparent adhesive tape; and
the adhesive tape is a single-sided adhesive tape, or the adhesive tape comprises a base layer and double-sided adhesive layers adhered to regions of the base layer that directly face the outer wall of the plastic frame.

12. The backlight module according to claim 2, wherein the two parallel non-incident sides of the plastic frame have symmetric structures with respective first step grooves at their respective side edges.

13. The backlight module according to claim 2, wherein the plastic frame and the cover structure are configured in an integrated structure.

14. The backlight module according to claim 1, wherein the two parallel non-incident sides of the plastic frame have symmetric structures with respective first step grooves at their respective side edges.

15. The backlight module according to claim 1, wherein the plastic frame and the cover structure are configured in an integrated structure.

16. A display device comprising the backlight module according to claim 1.

* * * * *